United States Patent
Li et al.

(10) Patent No.: US 12,309,006 B2
(45) Date of Patent: May 20, 2025

(54) CARRIER PROCESSING METHOD, BASEBAND UNIT, AND STORAGE MEDIUM

(71) Applicant: HUAWEI TECHNOLOGIES CO., LTD., Guangdong (CN)

(72) Inventors: Yibu Li, Shanghai (CN); Jiang Zhu, Shanghai (CN); Zhenghu Ding, Shanghai (CN); Yongmei Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/460,617

(22) Filed: Sep. 4, 2023

(65) Prior Publication Data
US 2023/0412432 A1 Dec. 21, 2023

Related U.S. Application Data

(63) Continuation of application No. PCT/CN2021/080421, filed on Mar. 12, 2021.

(51) Int. Cl.
*H04L 25/03* (2006.01)
*H04B 17/309* (2015.01)
*H04W 72/12* (2023.01)

(52) U.S. Cl.
CPC ..... *H04L 25/03828* (2013.01); *H04B 17/309* (2015.01); *H04W 72/12* (2013.01)

(58) Field of Classification Search
CPC ............. H04L 25/03828; H04L 47/125; H04L 25/0202; H04B 17/309; H04W 72/12; H04W 28/0862; H04W 36/165; H04W 52/0203; H04W 72/542; H04W 72/0453; H04W 28/08; H04W 72/52; H04W 88/08; H04W 92/12; H04W 24/10; Y02D 30/70
See application file for complete search history.

(56) References Cited

U.S. PATENT DOCUMENTS

| | | | |
|---|---|---|---|
| 11,184,037 B1 * | 11/2021 | Shattil | H04B 1/0003 |
| 2012/0314635 A1 * | 12/2012 | Lee | H04W 52/0212 370/311 |
| 2019/0274162 A1 * | 9/2019 | Zhang | H04W 74/0808 |

\* cited by examiner

*Primary Examiner* — Sung S Ahn

(57) ABSTRACT

This application discloses a carrier processing method. obtaining a signal quality measurement report; determining, based on the signal quality measurement report, a first carrier set and first spectral efficiency corresponding to all first carriers in the first carrier set; determining, based on first relationships and the first spectral efficiency corresponding to all the first carriers, first energy consumption growth coefficients corresponding to all the first carriers, where the first relationships indicate correspondences between energy consumption of a radio unit RU and loads of carriers, the carriers are carriers corresponding to the RU, and the first energy consumption growth coefficient reflects an energy consumption growth rate corresponding to a physical resource growth; and selecting a target carrier based on the first energy consumption growth coefficients corresponding to all the first carriers, and indicating a target terminal device to camp on a cell corresponding to the target carrier.

20 Claims, 6 Drawing Sheets

CARRIER PROCESSING METHOD, BASEBAND UNIT, AND STORAGE MEDIUM

CROSS-REFERENCE TO RELATED APPLICATIONS

This application is a continuation of International Application No. PCT/CN2021/080421, filed on Mar. 12, 2021, the disclosure of which is hereby incorporated by reference in its entirety.

TECHNICAL FIELD

This application relates to the field of communications technologies, and specifically, to a carrier processing method, a baseband unit, and a storage medium.

BACKGROUND

With the development of wireless networks, carriers of various standards and frequency bands are gradually increasing, and different services are provided for users due to selection of carriers in different forms.

After determining loads of covered cells and performing load information exchange between the cells, a base station may select a carrier with a low load, and then hand over a terminal device from a cell with a high load to a cell with a low load for camping. In other words, the base station coordinates, in a mobility load balancing (MLB) manner, load distribution between cells located in an intra-frequency system or an inter-frequency system, to select a carrier, and then provide a service for the terminal device by using the selected carrier.

However, in an existing wireless network, a plurality of carriers usually cover a same area, and a base station selects a carrier in a mobility load balancing manner. In consideration of only a load status (for example, a throughput or a rate), it is difficult to select an appropriate carrier to provide a service for a terminal device.

SUMMARY

Embodiments of this application provide a carrier processing method, a baseband unit, and a storage medium, to select an appropriate carrier for a target terminal device, and further reduce energy consumption of an RU when carriers provide a same service.

A first aspect of the embodiments of this application provides a carrier processing method. The processing method may be applied to a baseband unit, and the processing method may include: obtaining a signal quality measurement report reported by a target terminal device; determining, based on the signal quality measurement report, a first carrier set and first spectral efficiency corresponding to all first carriers in the first carrier set, where the first carrier is a carrier that can be accessed by the target terminal device; determining, based on first relationships and the first spectral efficiency corresponding to all the first carriers, first energy consumption growth coefficients corresponding to all the first carriers, where the first relationships indicate correspondences between energy consumption of a radio unit RU and loads of carriers, the carriers are carriers corresponding to the RU, and the first energy consumption growth coefficient reflects an energy consumption growth rate corresponding to a physical resource growth; and selecting a target carrier based on the first energy consumption growth coefficients corresponding to all the first carriers, and indicating the target terminal device to camp on a cell corresponding to the target carrier.

In the foregoing manner, a load energy consumption model is constructed with reference to an energy consumption status of the RU on a basis of considering the loads of the carriers, to obtain the first relationships by using the load energy consumption model. In this way, after obtaining the signal quality measurement report reported by the target terminal device, the baseband unit can determine, based on the signal quality measurement report, the first spectral efficiency corresponding to all the first carriers; then determine, based on the foregoing first relationships and the first spectral efficiency corresponding to all the first carriers, the first energy consumption growth coefficients corresponding to all the first carriers; and then select a target carrier that causes relatively low energy consumption for the RU when a same service is provided, so that an appropriate carrier is selected for the target terminal device, and energy consumption of the RU can be further reduced when the carriers provide a same service.

In some embodiments, the determining, based on first relationships and the first spectral efficiency corresponding to all the first carriers, first energy consumption growth coefficients corresponding to all the first carriers may include: performing derivation calculation on the first relationships to obtain energy consumption growth rates; and determining, based on the energy consumption growth rates and the first spectral efficiency corresponding to all the first carriers, the first energy consumption growth coefficients corresponding to all the first carriers. It should be noted that the first relationships can indicate the correspondences between the energy consumption of the RU and the loads of the carriers, and the described carriers are the carriers corresponding to the RU, namely, all carriers that can be selected by the RU for use when the RU transmits a signal. In addition, the described loads of the carriers are downlink scheduling loads of the carriers. The described first energy consumption growth coefficient of each first carrier can reflect an energy consumption growth rate corresponding to a physical resource growth on the first carrier, namely, an energy consumption growth of a unit physical resource on the first carrier, which may also be understood as a unit energy consumption amount added to the RU each time a load of one unit amount is added to each first carrier.

In some embodiments, the selecting a target carrier based on the first energy consumption growth coefficients corresponding to all the first carriers may include: determining a smallest energy consumption growth coefficient from the first energy consumption growth coefficients corresponding to all the first carriers; and selecting, as the target carrier, a first carrier corresponding to the smallest energy consumption growth coefficient.

In some embodiments, after the determining, based on the signal quality measurement report, a first carrier set, the processing method may further include: determining second spectral efficiency of all second carriers in a second carrier set based on scheduling information, where the second carrier is a carrier that is in the first carrier set and that has established a connection to the target terminal device; determining second energy consumption growth coefficients of all the second carriers based on the first relationships and the second spectral efficiency of all the second carriers; and obtaining, based on the second energy consumption growth coefficients of all the second carriers and a total amount of downlink scheduling data, amounts of downlink scheduling data scheduled by using the second carriers. In the foregoing manner, after determining the second energy consumption growth coefficients of all the second carriers, the baseband unit may determine, from the total amount of downlink scheduling data by using the second energy consumption growth coefficients, the amounts of downlink scheduling data that needs to be scheduled by using all the second carriers. In this way, on a basis that the target terminal device has established connections to the plurality of second carriers, the total amount of downlink scheduling data can be properly allocated to all the second carriers by using the second energy consumption growth coefficients of the second carriers; and overall energy consumption is further reduced.

In some other embodiments, the obtaining, based on the second energy consumption growth coefficients of all the second carriers and a total amount of downlink scheduling data, amounts of downlink scheduling data scheduled by using the second carriers may include: determining allocation weights of the second carriers based on the second energy consumption growth coefficients of all the second carriers, where the allocation weights of the second carriers reflect offloading proportions of the total amount of downlink scheduling data on all the second carriers; and determining, based on the allocation weights of all the second carriers and the total amount of downlink scheduling data, the amounts of downlink scheduling data scheduled by using the second carriers.

In some other embodiments, the determining allocation weights of the second carriers based on the second energy consumption growth coefficients of all the second carriers includes: processing the second energy consumption growth coefficients of all the second carriers according to a preset allocation rule, to obtain the allocation weights of the second carriers. It should be noted that the described preset allocation rule may be: increasing an allocation weight of a second carrier with a relatively small second energy consumption growth coefficient, and decreasing an allocation weight of a second carrier with a relatively large second energy consumption growth coefficient.

In some other embodiments, the first relationships are obtained based on a trained load energy consumption model, the trained load energy consumption model is a model obtained after a load energy consumption model is iteratively trained by using historical energy consumption information of the RU and historical load information of the carriers as training data, and output of the load energy consumption model indicates the relationships between the energy consumption of the RU and the loads of the carriers.

In some other embodiments, before the obtaining a signal quality measurement report, the processing method may further include: selecting the target terminal device from at least one terminal device, where a running rate of the target terminal device is greater than or equal to a preset threshold. In the foregoing manner, the baseband unit may select, as the target terminal device, a terminal device whose running rate is greater than or equal to the preset threshold, and discard a terminal device whose running rate is relatively low, thereby laying a foundation for subsequently selecting an appropriate carrier.

A second aspect of the embodiments of this application provides a baseband unit. The baseband unit may include: an obtaining module, configured to obtain a signal quality measurement report reported by a target terminal device; a determining module, configured to determine, based on the signal quality measurement report, a first carrier set and first spectral efficiency corresponding to all first carriers in the first carrier set, where the first carrier is a carrier that can be accessed by the target terminal device, where the determining module is configured to determine, based on first relationships and the first spectral efficiency corresponding to all the first carriers, first energy consumption growth coefficients corresponding to all the first carriers, where the first relationships indicate correspondences between energy consumption of a radio unit RU and loads of carriers, the carriers are carriers corresponding to the RU, and the first energy consumption growth coefficient reflects an energy consumption growth rate corresponding to a physical resource growth; and a selection module, configured to: select a target carrier based on the first energy consumption growth coefficients corresponding to all the first carriers, and indicate the target terminal device to camp on a cell corresponding to the target carrier.

In some embodiments, the determining module is specifically configured to: perform derivation calculation on the first relationships to obtain energy consumption growth rates; and determine, based on the energy consumption growth rates and the first spectral efficiency corresponding to all the first carriers, the first energy consumption growth coefficients corresponding to all the first carriers.

In some other embodiments, the selection module is specifically configured to: determine a smallest energy consumption growth coefficient from the first energy consumption growth coefficients corresponding to all the first carriers; and select, as the target carrier, a first carrier corresponding to the smallest energy consumption growth coefficient.

In some other embodiments, the determining module is further specifically configured to: after determining the first carrier set based on the signal quality measurement report, determine second spectral efficiency of all second carriers in a second carrier set based on scheduling information, where the second carrier is a carrier that is in the first carrier set and that has established a connection to the target terminal device; determine second energy consumption growth coefficients of all the second carriers based on the first relationships and the second spectral efficiency of all the second carriers; and obtain, based on the second energy consumption growth coefficients of all the second carriers and a total amount of downlink scheduling data, amounts of downlink scheduling data scheduled by using the second carriers.

In some other embodiments, the determining module is specifically configured to: determine allocation weights of the second carriers based on the second energy consumption growth coefficients of all the second carriers, where the allocation weights of the second carriers reflect offloading proportions of the total amount of downlink scheduling data on all the second carriers; and determine, based on the allocation weights of all the second carriers and the total amount of downlink scheduling data, the amounts of downlink scheduling data scheduled by using the second carriers.

In some other embodiments, the determining module is specifically configured to process the second energy consumption growth coefficients of all the second carriers according to a preset allocation rule, to obtain the allocation weights of the second carriers.

In some other embodiments, the first relationships are obtained based on a trained load energy consumption model, the trained load energy consumption model is a model obtained after a load energy consumption model is iteratively trained by using historical energy consumption information of the RU and historical load information of the carriers as training data, and output of the load energy consumption model indicates the relationships between the energy consumption of the RU and the loads of the carriers.

In some other embodiments, the selection module is further specifically configured to: before the obtaining module obtains the signal quality measurement report reported by the target terminal device, select the target terminal device from at least one terminal device, where a running rate of the target terminal device is greater than or equal to a preset threshold.

According to a third aspect, an embodiment of this application provides another carrier processing method. The processing method may be applied to a baseband unit, and the processing method may include: determining second spectral efficiency of all second carriers in a second carrier set based on scheduling information, where the second carrier is a carrier that has established a connection to a target terminal device; determining second energy consumption growth coefficients of all the second carriers based on first relationships and the second spectral efficiency of all the second carriers, where the first relationships indicate correspondences between energy consumption of a radio unit RU and loads of carriers; and obtaining, based on the second energy consumption growth coefficients of all the second carriers and a total amount of downlink scheduling data, amounts of downlink scheduling data scheduled by using the second carriers. In the foregoing manner, after determining the second energy consumption growth coefficients of all the second carriers, the baseband unit may determine, from the total amount of downlink scheduling data by using the second energy consumption growth coefficients, the amounts of downlink scheduling data that needs to be scheduled by using all the second carriers. In this way, on a basis that the target terminal device has established connections to the plurality of second carriers, the total amount of downlink scheduling data can be properly allocated to all the second carriers by using the second energy consumption growth coefficients of the second carriers; and overall energy consumption is further reduced.

In some other embodiments, the obtaining, based on the second energy consumption growth coefficients of all the second carriers and a total amount of downlink scheduling data, amounts of downlink scheduling data scheduled by using the second carriers may include: determining allocation weights of the second carriers based on the second energy consumption growth coefficients of all the second carriers, where the allocation weights of the second carriers reflect offloading proportions of the total amount of downlink scheduling data on all the second carriers; and determining, based on the allocation weights of all the second carriers and the total amount of downlink scheduling data, the amounts of downlink scheduling data scheduled by using the second carriers.

In some other embodiments, the determining allocation weights of the second carriers based on the second energy consumption growth coefficients of all the second carriers includes: processing the second energy consumption growth coefficients of all the second carriers according to a preset allocation rule, to obtain the allocation weights of the second carriers. It should be noted that the described preset allocation rule may be: increasing an allocation weight of a second carrier with a relatively small second energy consumption growth coefficient, and decreasing an allocation weight of a second carrier with a relatively large second energy consumption growth coefficient.

In some other embodiments, the first relationships are obtained based on a trained load energy consumption model, the trained load energy consumption model is a model obtained after a load energy consumption model is iteratively trained by using historical energy consumption information of the RU and historical load information of the carriers as training data, output of the load energy consumption model indicates the relationships between the energy consumption of the RU and the loads of the carriers, and the carriers are carriers corresponding to the RU.

A fourth aspect of this application provides a baseband unit. The baseband unit may include a memory, configured to store computer-readable instructions. The baseband unit may further include a processor coupled to the memory. The processor is configured to execute the computer-readable instructions in the memory, to perform the processing method according to any one of the first aspect or the possible implementations of the first aspect.

A fifth aspect of this application provides a computer-readable storage medium. When instructions run on a computer apparatus, the computer apparatus is enabled to perform the processing method according to any one of the first aspect or the possible implementations of the first aspect.

A sixth aspect of this application provides a computer program product. When the computer program product runs on a computer, the computer is enabled to perform the processing method according to any one of the first aspect or the possible implementations of the first aspect.

A seventh aspect of this application provides a chip system. The chip system may include a processor, configured to support a baseband unit in implementing the functions in the processing method according to any one of the first aspect or the possible implementations of the first aspect.

Optionally, with reference to the seventh aspect, in a first possible implementation, the chip system may further include a memory. The memory is configured to store necessary program instructions and data of the baseband unit. The chip system may include a chip, or may include a chip and another discrete device. The chip system may include an application-specific integrated circuit (ASIC), a field programmable gate array (FPGA), another programmable logic device, or the like. Further, the chip system may further include an interface circuit and the like.

It should be noted that beneficial effects brought by the implementations of the second aspect and the fourth aspect to the seventh aspect of this application may be understood with reference to the beneficial effects brought by the implementations of the first aspect. Details are not described herein again.

In the embodiments of this application, because the first relationships can indicate the correspondences between the energy consumption of the RU and the loads of the carriers, after obtaining the signal quality measurement report reported by the target terminal device, the baseband unit may determine, based on the signal quality measurement report, the first carrier set and the first spectral efficiency corresponding to all the first carriers in the first carrier set, and then determine, based on the first spectral efficiency corresponding to all the first carriers and the first relationships, the first energy consumption growth coefficients corresponding to all the first carriers. In this way, the baseband unit can select the target carrier based on the first energy consumption growth coefficients corresponding to all the first carriers, and then the target carrier provides a service for the target terminal device. Therefore, an appropriate carrier is selected for the terminal device, and further energy consumption of the RU can be reduced when the carriers provide a same service.

DESCRIPTION OF EMBODIMENTS

Embodiments of this application provide a carrier processing method, a baseband unit, and a storage medium, to select an appropriate carrier for a terminal device, and further reduce energy consumption of an RU when carriers provide a same service.

The following clearly and completely describes the technical solutions in embodiments of this application with reference to the accompanying drawings in embodiments of this application. It is clear that the described embodiments are some but not all of embodiments of this application. All other embodiments obtained by persons of ordinary skill in the art based on embodiments of this application without creative efforts shall fall within the protection scope of this application.

In the specification, claims, and accompanying drawings of this application, the terms "first", "second", "third", "fourth", and the like (if existent) are intended to distinguish between similar objects but are not necessarily intended to describe a specific order or sequence. It should be understood that the data termed in such a way is interchangeable in proper circumstances so that the embodiments of this application described herein can be implemented in orders except the order illustrated or described herein. Moreover, the terms "include", "have", and any other variants thereof are intended to cover non-exclusive inclusions. In this application, "at least one" means one or more, and "a plurality of" means two or more. "At least one of the following items (pieces)" or a similar expression thereof indicates any combination of these items, including a single item (piece) or any combination of a plurality of items (pieces). For example, at least one of a, b, or c may represent a, b, c, a and b, a and c, b and c, or a, b, and c, where a, b, and c may be singular or plural. It should be noted that "at least one item (piece)" may also be explained as "one item (piece) or more items (pieces)".

Figure 1:
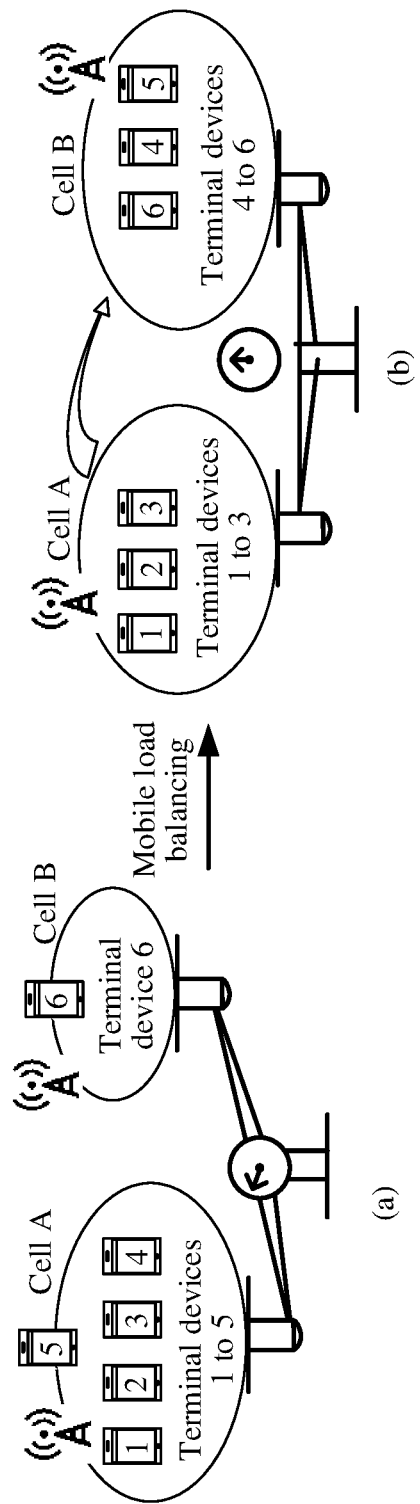
FIG. 1 is a schematic diagram of carrier selection according to an existing solution.

With the development of wireless networks, carriers of various standards and frequency bands are gradually increasing, and different services are provided for users due to selection of carriers in different forms. In a related technology, after determining loads of covered cells and performing load information exchange between the cells, a base station selects a carrier with a relatively low load, and then hands over a terminal device from a cell with a relatively high load to a cell with a relatively low load for camping. FIG. 1 is a schematic diagram of carrier selection according to an existing solution. It can be learned from FIG. 1 that a base station covers a cell A and a cell B, and provides, by using at least one carrier, a service for a terminal device that camps on the cell A and a terminal device that camps on the cell B. In addition, it can be learned from a part a in FIG. 1 that five terminal devices (for example, terminal devices 1 to 5) camp on the cell A, and therefore a load of the cell A is relatively high; and only one terminal device (for example, a terminal device 6) camps on the cell B, and therefore a load of the cell B is relatively low, and a relatively large quantity of network resources are left. Therefore, to maximally utilize network resources, after determining the load of the cell A and the load of the cell B in the part a, the base station selects a carrier corresponding to the cell B with the relatively low load, to provide a service for a terminal device that camps on the cell A. In this way, the base station can hand over at least one terminal device (for example, the terminal device 4 and the terminal device 5) that originally camps on the cell A from the cell A to the cell B for camping, to provide a service for the terminal device 4 and the terminal device 5 by using the carrier corresponding to the cell B. For details, refer to a part b in FIG. 1 for understanding. In other words, in the carrier selection shown in FIG. 1, the base station coordinates, in a mobility load balancing manner, load distribution between cells located in an intra-frequency system or an inter-frequency system, to select a carrier, and then provide a service for the terminal device by using the selected carrier. In addition, it should be noted that the terminal device described above may include but is not limited to a handheld terminal, a notebook computer, a subscriber unit (subscriber unit), a cellular phone (cellular phone), a smartphone (smartphone), a wireless data card, a personal digital assistant (personal digital assistant, PDA) computer, a tablet computer, a wireless modem (modem), a handheld (handheld) device, a laptop computer (laptop computer), or another device that can access a network. This is not limited herein.

Figure 2:
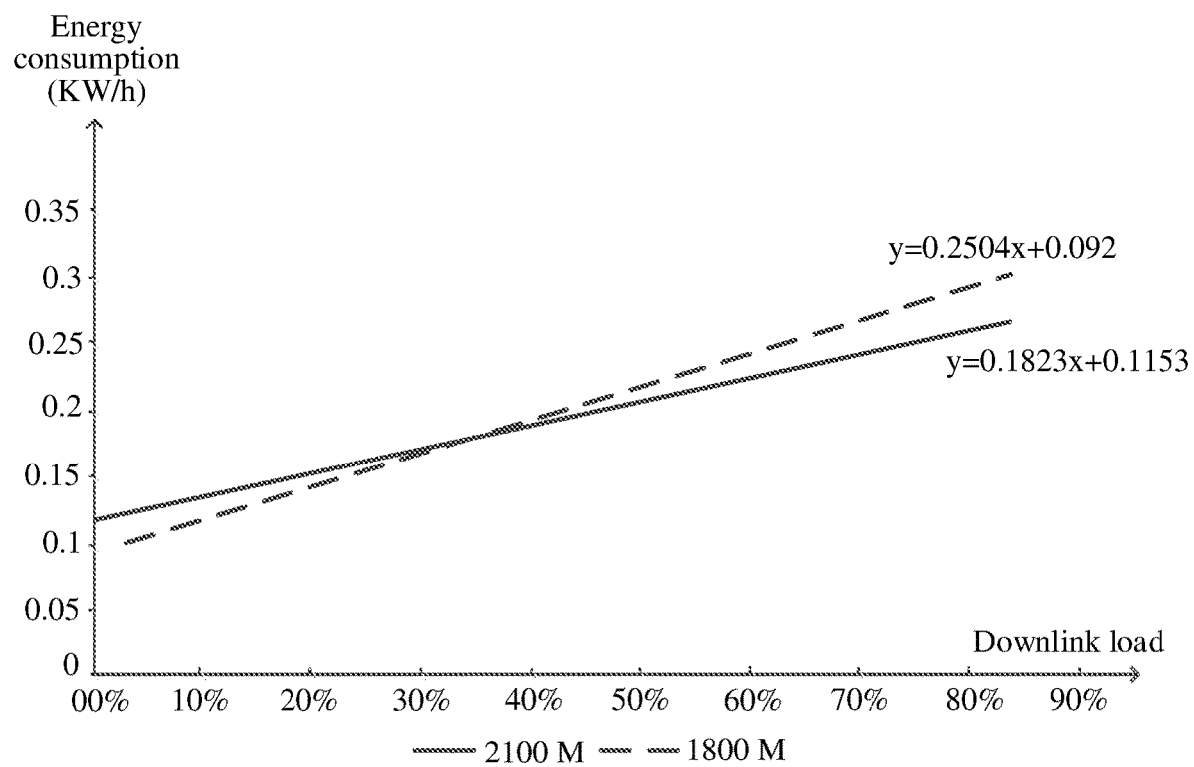
FIG. 2 is a schematic diagram of relationships between loads of different carriers and energy consumption of a radio unit according to an embodiment of this application.

However, in a wireless network, a plurality of carriers usually cover a same area, and a spectral efficiency difference between the plurality of carriers, an individual difference of a radio unit (radio unit, RU), and the like cause a difference in energy consumption required by different carriers when the carriers provide a same service, affecting carrier selection. FIG. 2 is a schematic diagram of relationships between loads of different carriers and energy consumption of a radio unit according to an embodiment of this application. It can be learned from FIG. 2 that, under a same load growth of different carriers, there is also a difference in energy consumption growth amplitude of a radio unit. For example, as shown in FIG. 2, a load energy consumption model corresponding to a carrier 1 of 2100 M is y=0.2504x+0.092, where x is a load of the carrier, and y is energy consumption of the RU; and a load energy consumption model corresponding to a carrier 2 of 1800 M is y=0.1823x+0.1153. Even if the carrier 1 and the carrier 2 are consistent in bandwidth and consistent in spectral efficiency, there is a difference of 0.0681 kw/h between an energy consumption growth corresponding to the carrier 1 and an energy consumption growth corresponding to carrier 2. Therefore, if both the carrier 1 and the carrier 2 transmit 20% of a unit service data amount, a difference between corresponding energy consumption growths is at least 30%.

Therefore, there is also a difference between energy consumption required by different carriers when the carries provide a same service, affecting carrier selection. Therefore, in the existing solution shown in FIG. 1, in consideration of only a load status for carrier selection, it is difficult to select a relatively appropriate carrier to provide a service for a terminal device, and it is not conducive to reducing consumption of network resources of the base station.

Figure 3:
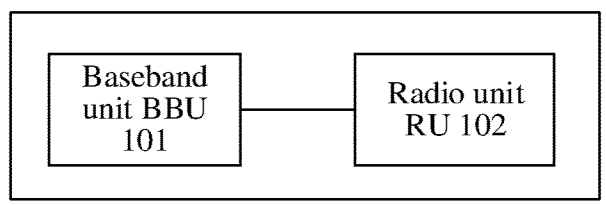
FIG. 3 is a schematic diagram of a framework of a system according to an embodiment of this application.

To resolve the foregoing problem, in this application, a load energy consumption model is constructed by using historical load information of carriers and historical energy consumption information of a radio unit, to explicitly express relationships between loads of the carriers and energy consumption of the radio unit. In this way, a proper carrier is selected for a terminal device from a perspective of relatively good energy consumption by using the load energy consumption model, to provide a service, thereby reducing consumption of network resources of a base station. Specifically, FIG. 3 is a schematic diagram of a framework of a system according to an embodiment of this application. The system may include at least one baseband unit (baseband unit, BBU) and at least one radio unit RU. FIG. 3 is described by using an example in which one BBU 101 and one RU 102 are included. It should be noted that the BBU 101 and the RU 102 may be physically disposed together, or may be physically separated, that is, in a distributed network device. An interface between the BBU 101 and the RU 102 may be an optical interface, and data may be transmitted between the BBU 101 and the RU 102 through an optical fiber.

It should be noted that the RU 102 is mainly configured to send energy consumption information to the BBU 101, so that the BBU 101 can construct a load energy consumption model. In addition, the BBU 101 is mainly configured to perform baseband signal processing, network device control, and the like. The baseband signal processing includes channel coding, multiplexing, modulation, spectrum spreading, amplitude limitation on power of a carrier, cancelation of amplitude limitation on power, and the like. The BBU 101 configures a mapping relationship between the RU 102 and at least one carrier, and then may use, as training data, historical energy consumption information of the RU 102 and historical load information of carriers having mapping relationships with the RU 102, to construct a load energy consumption model. In this way, after obtaining a signal quality measurement report sent by a target terminal device, the BBU 101 can determine, based on the signal quality measurement report, a first carrier set and first spectral efficiency corresponding to all first carriers in the first carrier set; then determine, based on the first spectral efficiency corresponding to all the first carriers and first relationships obtained by using the load energy consumption model, first energy consumption growth coefficients corresponding to all the first carriers; and then select a target carrier based on the first energy consumption growth coefficients corresponding to all the first carriers, and indicate that the target terminal device can camp on a cell corresponding to the target carrier. For example, the BBU 101 may include one or more boards. A plurality of boards may jointly support a radio access network of a single access standard, for example, long term evolution (long term evolution, LTE), may support an NR system, or may be applied between an LTE system and an NR system. This is not limited herein.

Figure 4:
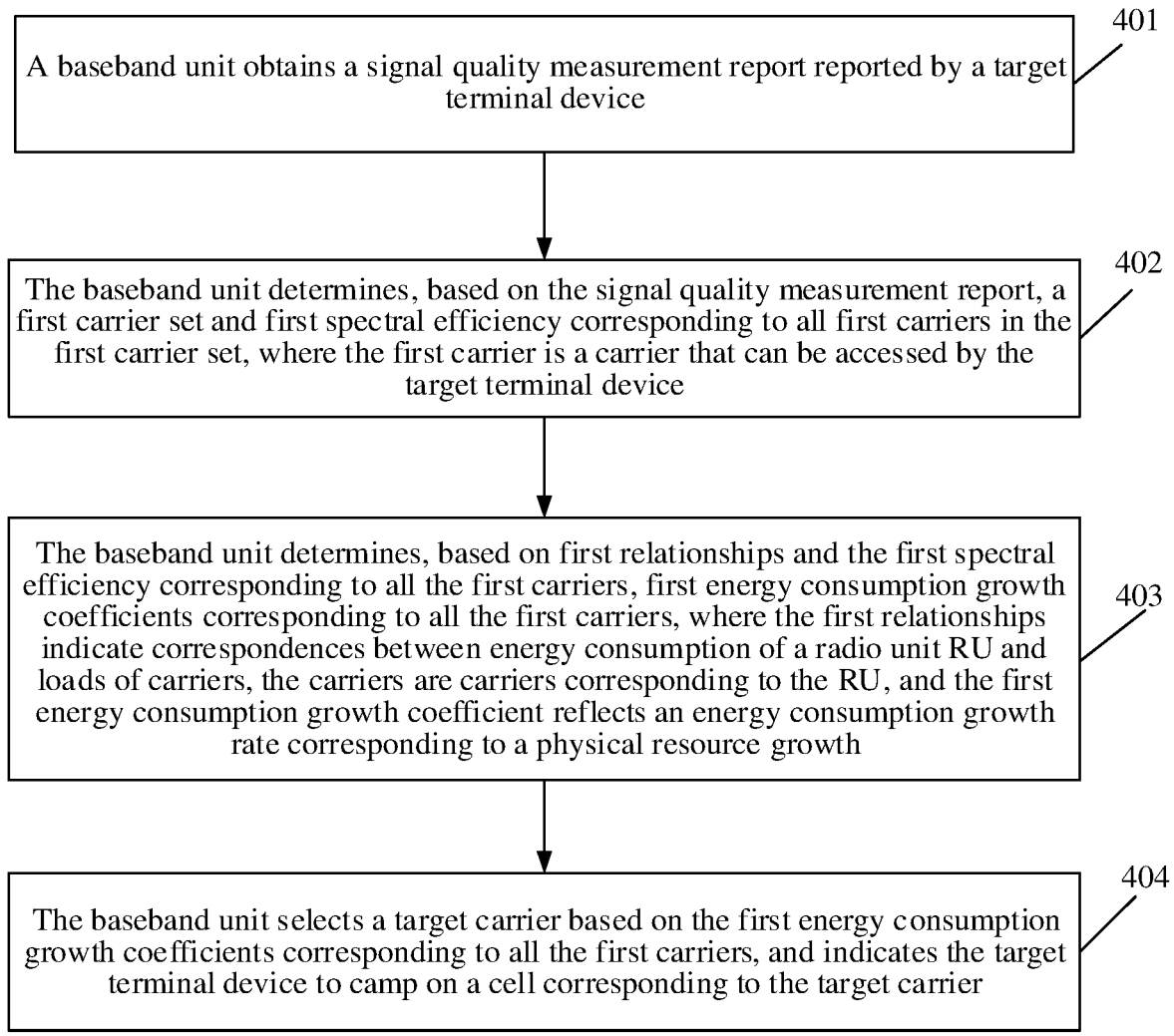
FIG. 4 is a schematic flowchart of a carrier processing method according to an embodiment of this application.

Based on the foregoing content, FIG. 4 is a schematic flowchart of a carrier processing method according to an embodiment of this application. In FIG. 4, a baseband unit may be the BBU 101 in FIG. 3, and a radio unit may be the RU 102 in FIG. 3. This is not specifically limited herein. As shown in FIG. 4, the carrier processing method may include the following steps.

401: The baseband unit obtains a signal quality measurement report reported by a target terminal device.

In this example, measurement is an important basis for detecting signal quality and handing over a terminal device camped on a cell. The described signal quality measurement report can reflect information such as signal quality, signal strength, and received code power of carriers, and can further reflect other information such as packet loss rates and congestion rates of the carriers. Therefore, to learn of candidate carriers that can provide a service for the target terminal device and spectral efficiency corresponding to all the candidate carriers, the baseband unit may send a measurement report request to the target terminal device, so that the target terminal device measures the signal quality, the signal strength, and the like of the carriers. After obtaining the corresponding signal quality measurement report through measurement, the target terminal device may report the signal quality measurement report to the baseband unit. In this way, the baseband unit can obtain the signal quality measurement report.

Optionally, in some examples, before obtaining the signal quality measurement report, the baseband unit may further preprocess a large quantity of terminal devices in a coverage area of the baseband unit, to select the target terminal device that can perform steps 401 to 404. Specifically, before the baseband unit obtains the measurement report reported by the target terminal device, the baseband unit selects the target terminal device from at least one terminal device, where a running rate of the target terminal device is greater than or equal to a preset threshold. In other words, the baseband unit may determine whether a running rate of the at least one terminal device is greater than or equal to the preset threshold; and if a terminal device whose running rate is greater than or equal to the preset threshold exists in the at least one terminal device, the baseband unit may select, as the target terminal device, the terminal device whose running rate is greater than or equal to the preset threshold, and discard a terminal device whose running rate is relatively low, thereby laying a foundation for subsequently selecting an appropriate carrier.

402: The baseband unit determines, based on the signal quality measurement report, a first carrier set and first spectral efficiency corresponding to all first carriers in the first carrier set, where the first carrier is a carrier that can be accessed by the target terminal device.

In this example, because the signal quality measurement report can reflect information such as the signal quality and the signal strength of the carriers, the baseband unit can determine the first carrier set from a large quantity of carriers based on the signal quality measurement report. Each first carrier in the described first carrier set may be understood as a carrier that can be selected by the target terminal device for access.

In addition, the spectral efficiency is also referred to as frequency band utilization, may be understood as a quantity of bits that can be transmitted per second on a transmission channel of a unit bandwidth, and is an important indicator that can be used to measure effectiveness of a communications system. Therefore, after determining the first carrier set based on the signal quality measurement report, the baseband unit may further determine, based on the signal quality measurement report, the first spectral efficiency corresponding to all the first carriers, where all first spectral efficiency can reflect radio resources required for unit data transmitted on all the first carriers. The described radio resource may be a time domain resource and/or a frequency domain resource. This is not limited herein.

403: The baseband unit determines, based on first relationships and the first spectral efficiency corresponding to all the first carriers, first energy consumption growth coefficients corresponding to all the first carriers, where the first relationships indicate correspondences between energy consumption of the radio unit RU and loads of carriers, the carriers are carriers corresponding to the RU, and the first energy consumption growth coefficient reflects an energy consumption growth rate corresponding to a physical resource growth.

In this example, the first relationships can indicate the correspondences between the energy consumption of the RU and the loads of the carriers. The described carriers are the carriers corresponding to the RU, and are also understood as carriers borne by the RU or all carriers having mapping relationships with the RU, namely, all carriers that can be selected by the RU for use when the RU transmits a signal. In addition, the described loads of the carriers are downlink loads of the carriers. For example, in an LTE system, a downlink load of a carrier may be a ratio of an actual physical resource block (PRB) of the carrier to a maximum available PRB. In a universal mobile telecommunications system (UMTS), a downlink load of a carrier may be a ratio of actual power of the carrier to maximum allowable power. In 5G new radio (NR), a downlink load of a carrier may be a ratio of an actual physical resource block (PRB) of a to-be-measured cell to a maximum available PRB, or may be a ratio of actual power of the carrier to maximum allowable power.

Figure 5:
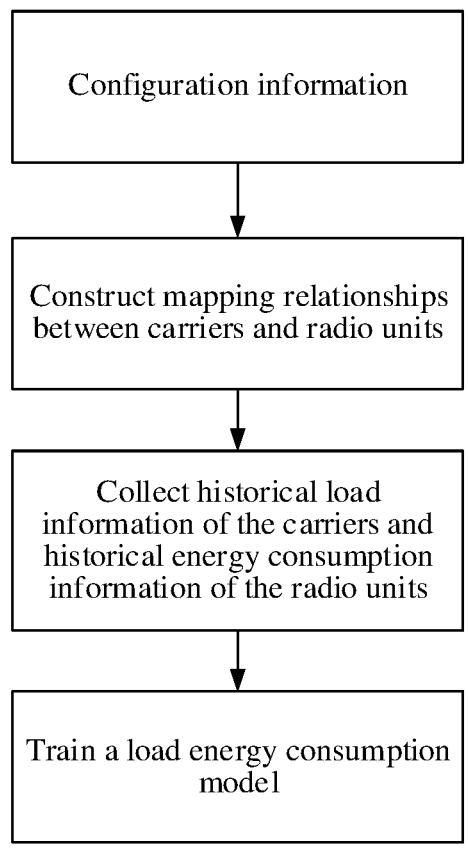
FIG. 5 is a schematic flowchart of constructing a load energy consumption model according to an embodiment of this application.

The first relationships described above are obtained based on a trained load energy consumption model, the trained load energy consumption model is a model obtained after a load energy consumption model is iteratively trained by using historical energy consumption information of the RU and historical load information of the carriers as training data, and output of the load energy consumption model indicates the relationships between the energy consumption of the RU and the loads of the carriers. Specifically, FIG. 5 is a schematic flowchart of constructing a load energy consumption model according to an embodiment of this application. It can be learned from FIG. 5 that a process of constructing a load energy consumption model may be understood with reference to the following content:

First, before training a load energy consumption model, the baseband unit may first construct mapping relationships between carriers and RUs based on configuration information. Then, the baseband unit may periodically collect historical load information of carriers corresponding to cells covered by a base station and historical energy consumption information of RUs based on the mapping relationships, and use the historical load information and the historical energy consumption information as initial sample data. It should be noted that the described configuration information may include but is not limited to transmit power of the carriers, information about sectors deployed in the cells corresponding to the carriers, and the like. This is not limited herein.

Then, on a basis that the RU is used as an information integration indicator, the baseband unit re-integrates the historical load information of the carriers and the historical energy consumption information of the RUs based on the constructed mapping relationships. In this way, training sample data finally obtained through integration is historical information samples based on the RUs in different time periods. In other words, it is understood that for any RU, historical energy consumption information of the RU and historical load information of all carriers having mapping relationships with the RU are used as one piece of training sample data, and then a training sample data set corresponding to the RU may be obtained for training sample data in different time periods. For example, for the RU 102 in FIG. 3, if carriers having mapping relationships with the RU 102 include a carrier 1, a carrier 3, and a carrier 5, information of historical energy consumption information of the RU 102, historical load information of the carrier 1, historical load information of the carrier 3, and historical load information of the carrier 5 in different time periods may be used as one piece of training sample data. This is not specifically limited herein. In addition to different time periods, training sample data may be alternatively integrated based on different time points. This is not limited herein. In this way, the baseband unit can obtain a large quantity of training samples for the RU by using historical energy consumption information of the RU and historical load information of all the corresponding carriers in different time periods.

Finally, the baseband unit may train a load energy consumption model for each RU by using a simple linear regression algorithm or in a machine learning manner or the like, so that output of a trained load energy consumption model can indicate relationships between energy consumption of the RU and loads of carriers, in other words, the foregoing first relationships can be obtained. It should be noted that the first relationship may be represented by using a linear expression or a non-linear expression. This is specifically determined based on a case.

Therefore, after obtaining the first spectral efficiency corresponding to all the first carriers, the baseband unit may determine, with reference to the first relationships obtained based on the trained load energy consumption model, the first energy consumption growth coefficients respectively corresponding to all the first carriers. In this way, the baseband unit can learn of a unit energy consumption amount correspondingly added to the RU when one unit amount is added to a load of each first carrier, to provide, from a perspective of relatively good energy consumption, a direction for subsequently selecting a target carrier. It should be noted that the described first energy consumption growth coefficient of each first carrier can reflect an energy consumption growth rate corresponding to a physical resource growth on the corresponding first carrier, namely, an energy consumption growth of a unit physical resource on the first carrier, for example, a unit energy consumption amount added to the RU each time a load of one unit amount is added to each first carrier.

Optionally, in some examples, the baseband unit may specifically determine, in the following manner based on the first relationships and the first spectral efficiency corresponding to all the first carriers, the first energy consumption growth coefficients corresponding to all the first carriers: The baseband unit performs derivation calculation on the first relationships to obtain energy consumption growth rates; and then the baseband unit determines, based on the energy consumption growth rates and the first spectral efficiency corresponding to all the first carriers, the first energy consumption growth coefficients corresponding to all the first carriers.

It can be learned from FIG. 5 that the first relationships reflect the correspondences between the energy consumption of the RU and the loads of the carriers, and may also be understood as output of a load energy consumption model constructed by using the loads of the carriers as independent variables and using the energy consumption of the RU as a dependent variable. The first relationship may be specifically represented by using a linear expression or a non-linear expression. In this way, after learning of the first relationships, the baseband unit performs derivation calculation on the first relationships to obtain the corresponding energy consumption growth rates. Then, the baseband unit performs calculation according to the following formula 1 by using the energy consumption growth rates and the first spectral efficiency corresponding to all the first carriers, to obtain the first energy consumption growth coefficients corresponding to all the first carriers. It should be noted that the foregoing formula 1 is $L=K/A$ where L is the first energy consumption growth coefficient corresponding to the first carrier, K is the energy consumption growth rate, and A is the first spectral efficiency corresponding to the first carrier.

404: The baseband unit selects a target carrier based on the first energy consumption growth coefficients corresponding to all the first carriers, and indicates the target terminal device to camp on a cell corresponding to the target carrier.

In this example, after obtaining the first energy consumption growth coefficients corresponding to all the first carriers, the baseband unit may select the target carrier, and then indicate, by using a notification message or the like, that the target terminal device can be handed over from a currently camping cell to the cell corresponding to the target carrier. In this way, the baseband unit can provide a service for the target terminal device based on the target carrier. Specifically, the baseband unit may determine a smallest energy consumption growth coefficient from the first energy consumption growth coefficients corresponding to all the first carriers; and select, as the target carrier, a first carrier corresponding to the smallest energy consumption growth coefficient.

In this embodiment of this application, a load energy consumption model is constructed with reference to an energy consumption status of the RU on a basis of considering the loads of the carriers, to obtain the first relationships by using the load energy consumption model. In this way, after obtaining the signal quality measurement report reported by the target terminal device, the baseband unit can determine, based on the signal quality measurement report, the first spectral efficiency corresponding to all the first carriers; then determine, based on the foregoing first relationships and the first spectral efficiency corresponding to all the first carriers, the first energy consumption growth coefficients corresponding to all the first carriers; and then select a target carrier that causes relatively low energy consumption for the RU when a same service is provided. Therefore, an appropriate carrier is selected for the terminal device, and further energy consumption of the RU can be reduced when the carriers provide a same service.

Figure 6:
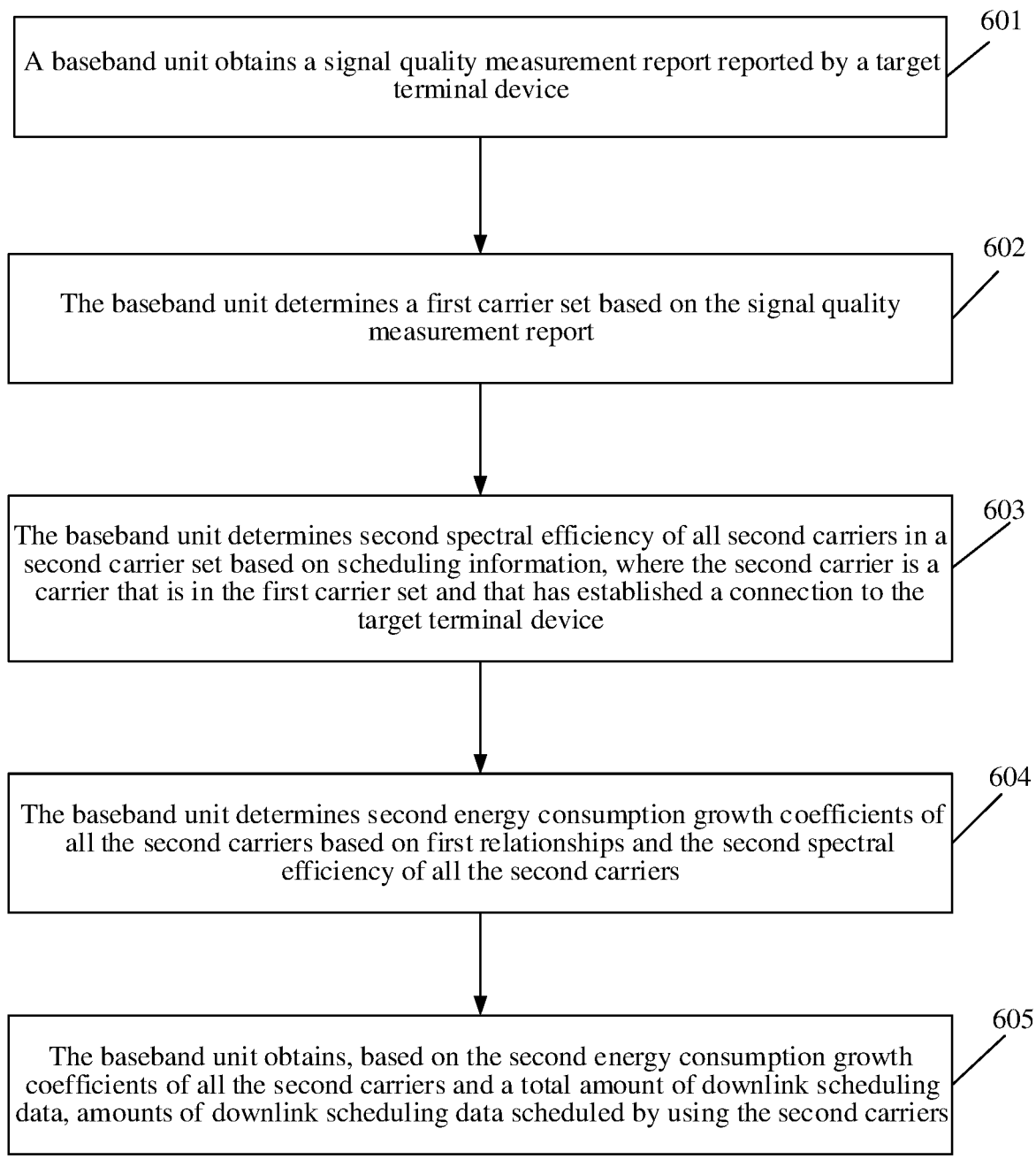
FIG. 6 is a schematic flowchart of another carrier processing method according to an embodiment of this application.

The foregoing mainly describes, from a perspective of relatively good energy consumption, a solution in which the target carrier is selected to provide a service for the terminal device by using the target carrier. The following describes, from a perspective of relatively good energy consumption, a solution in which an amount of data transmitted on a plurality of carriers is properly allocated to provide a service for the terminal device. Specifically, FIG. 6 is a schematic flowchart of another carrier processing method according to an embodiment of this application. It can be learned from FIG. 6 that the carrier processing method may include the following steps.

601: A baseband unit obtains a signal quality measurement report reported by a target terminal device.

602: The baseband unit determines a first carrier set based on the signal quality measurement report.

In this example, steps 601 and 602 may be understood with reference to steps 401 and 402 in FIG. 4. Details are not described herein again.

603: The baseband unit determines second spectral efficiency of all second carriers in a second carrier set based on scheduling information, where the second carrier is a carrier that is in the first carrier set and that has established a connection to the target terminal device.

In this example, the signal quality measurement report can reflect information such as signal quality and signal strength of carriers that can be accessed by the target terminal device. Therefore, after obtaining the signal quality measurement report, the baseband unit may further determine the scheduling information based on the signal quality measurement report, that is, determine, from the signal quality measurement report, real-time signal quality statuses corresponding to the carriers that can be accessed by the target terminal device, to obtain relatively accurate information such as signal quality and signal strength. Then, the baseband unit may select the second carrier set from the first carrier set based on historical signaling or the like, that is, select, from the set of the first carriers that can be accessed by the target terminal device, the second carriers that have established connections to the target terminal device. In this way, the baseband unit can determine the second spectral efficiency of all the second carriers in the second carrier set based on the scheduling information.

604: The baseband unit determines second energy consumption growth coefficients of all the second carriers based on first relationships and the second spectral efficiency of all the second carriers.

It can be learned from FIG. 5 that the first relationships can indicate correspondences between energy consumption of the RU and loads of carriers. Therefore, after obtaining the second spectral efficiency of all the second carriers, the baseband unit may determine, with reference to the first relationships obtained based on a trained load energy consumption model, the second energy consumption growth coefficients respectively corresponding to all the second carriers. Specifically, the baseband unit may perform derivation calculation on the first relationships to obtain corresponding energy consumption growth rates; and then respectively divide the energy consumption growth rates by the second spectral efficiency corresponding to all the second carriers, to obtain the energy consumption growth coefficients corresponding to all the second carriers. For details, refer to the formula 1 in step 403 in FIG. 4 for understanding. Details are not described herein.

It should be noted that the described second energy consumption growth coefficient of each second carrier can reflect an energy consumption growth rate corresponding to a physical resource growth on each second carrier, namely, an energy consumption growth of a unit physical resource on the second carrier, which may also be understood as a unit energy consumption amount added to the RU each time a load of one unit amount is added to each second carrier.

605: The baseband unit obtains, based on the second energy consumption growth coefficients of all the second carriers and a total amount of downlink scheduling data, amounts of downlink scheduling data scheduled by using the second carriers.

In this example, after determining the second energy consumption growth coefficients of all the second carriers, the baseband unit may determine, from the total amount of downlink scheduling data by using the second energy consumption growth coefficients, the amounts of downlink scheduling data that needs to be scheduled by using all the second carriers. In this way, on a basis that the target terminal device has established connections to the plurality of second carriers, the total amount of downlink scheduling data can be properly allocated to all the second carriers by using the second energy consumption growth coefficients of the second carriers; and overall energy consumption is further reduced.

Optionally, in some examples, the baseband unit obtains, based on the second energy consumption growth coefficients of all the second carriers and the total amount of downlink scheduling data, the amounts of downlink scheduling data scheduled by using the second carriers. Specifically, this may be implemented in the following manner: The baseband unit determines allocation weights of the second carriers based on the second energy consumption growth coefficients of all the second carriers, where the allocation weights of the second carriers reflect offloading proportions of the total amount of downlink scheduling data on all the second carriers; and then determines, based on the allocation weights of all the second carriers and the total amount of downlink scheduling data, the amounts of downlink scheduling data scheduled by using the second carriers.

In this example, the second energy consumption growth coefficient of each second carrier reflects an energy consumption growth of a unit physical resource on the second carrier. Therefore, in order that a second carrier with a larger second energy consumption growth coefficient can transmit less downlink data and a second carrier with a smaller second energy consumption growth coefficient can transmit more downlink data, the baseband unit may allocate a smaller weight to the second carrier with the larger second energy consumption growth coefficient, so that a load of the second carrier with the larger second energy consumption growth coefficient is reduced. In addition, the baseband unit allocates a larger weight to the second carrier with the smaller second energy consumption growth coefficient, so that a load of the second carrier with the smaller energy consumption growth coefficient can be correspondingly increased. Based on this, the baseband unit can determine the allocation weights of all the second carriers based on the second energy consumption growth coefficients of all the second carriers, where the allocation weights of all the second carriers respectively indicate the offloading proportions at which the total amount of downlink scheduling data is allocated to all the second carriers. In this way, after obtaining the total amount of downlink scheduling data that needs to be transmitted for the target terminal device, the baseband unit can respectively determine, based on the allocation weights of all the second carriers, the amounts of downlink scheduling data that needs to be scheduled by using all the second carriers.

It should be noted that the following may be followed to determine the allocation weights of the second carriers: increasing an allocation weight of a second carrier with a relatively small second energy consumption growth coefficient, and decreasing an allocation weight of a second carrier with a relatively large second energy consumption growth coefficient. For example, for the RU 102 in FIG. 3, it is assumed that carriers borne by the RU 102 include a carrier 1, a carrier 2, a carrier 3, a carrier 4, and a carrier 5, and carriers that have established connections to the target terminal device are the carrier 1, the carrier 3, and the carrier 4. In this case, if the baseband unit determines that a ratio among a second energy consumption growth coefficient of the carrier 1, a second energy consumption growth coefficient of the carrier 3, and a second energy consumption growth coefficient of the carrier 4 is 1:2:3, the baseband unit may set allocation weights of the carrier 1, the carrier 3, and the carrier 4 to 3:2:1, or other allocation weights, for example, 1:0:0, that is, all the amount of downlink scheduling data may be allocated to a second carrier (the carrier 1) with a smallest second energy consumption growth coefficient. It may be understood that, in actual application, the allocation weights may be alternatively determined as other weights based on a specific case. This is not limited herein.

In this embodiment of this application, after determining the second energy consumption growth coefficients of all the second carriers, the baseband unit may determine, from the total amount of downlink scheduling data by using the second energy consumption growth coefficients, the amounts of downlink scheduling data that needs to be scheduled by using all the second carriers. In this way, on a basis that the target terminal device has established connections to the plurality of second carriers, the total amount of downlink scheduling data can be properly allocated to all the second carriers by using the second energy consumption growth coefficients of the second carriers; and overall energy consumption of the RU is further reduced.

It may be understood that, to implement the foregoing functions, the baseband unit includes corresponding hardware structures and/or software modules for performing the functions. Persons skilled in the art should be easily aware that, in combination with the examples described in the embodiments disclosed in this specification, modules and algorithm steps can be implemented in this application in a form of hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

From a perspective of a hardware structure, the baseband unit in FIG. 3 to FIG. 6 may be implemented by one entity device, may be jointly implemented by a plurality of entity devices, or may be one logical functional module in one entity device. This is not specifically limited in the embodiments of this application.

Figure 7:
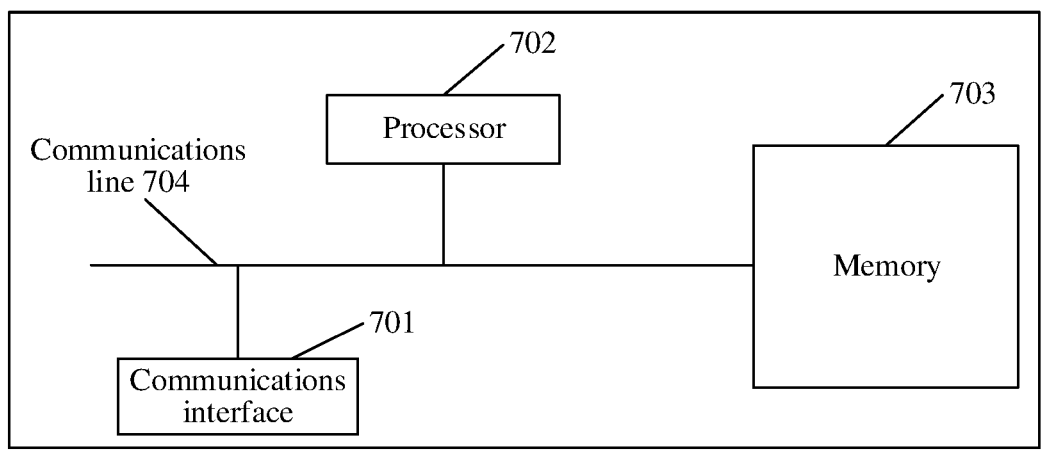
FIG. 7 is a schematic diagram of a hardware structure of a baseband unit according to an embodiment of this application.

For example, FIG. 7 is a schematic diagram of a hardware structure of a baseband unit according to an embodiment of this application. The baseband unit includes a communications interface 701 and a processor 702, and may further include a memory 703.

The communications interface 701 may be any apparatus such as a transceiver, and is configured to communicate with another device or a communications network, for example, the Ethernet, a radio access network (RAN), or a wireless local area network (WLAN).

The processor 702 includes but is not limited to one or more of a central processing unit (CPU), a network processor (NP), an application-specific integrated circuit (ASIC), or a programmable logic device (PLD). The PLD may be a complex programmable logic device (CPLD), a field programmable gate array (FPGA), generic array logic (GAL), or any combination thereof. The processor 702 is responsible for a communications line 704 and general processing, and may further provide various functions, including timing, peripheral interfacing, voltage regulation, power management, and another control function. The memory 703 may be configured to store data used by the processor 702 when the processor 702 performs an operation.

The memory 703 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another compact disk storage, an optical disc storage (including a compact disc, a laser disc, an optical disc, a digital versatile disc, a Blu-ray disc, and the like), a magnetic disk storage medium or another magnetic storage device, or any other medium that can carry or store expected program code in an instruction form or a data structure form and that can be accessed by a computer, but is not limited thereto. The memory 703 may exist independently, and is connected to the processor 702 by using the communications line 704. The memory 703 may be alternatively integrated with the processor 702. If the memory 703 and the processor 702 are components independent of each other, the memory 703 is connected to the processor 702. For example, the memory 703 may communicate with the processor 702 by using the communications line 704. The communications interface 701 may communicate with the processor 702 by using the communications line 704, or the communications interface 701 may be directly connected to the processor 702.

The communications line 704 may include any quantities of interconnected buses and bridges, and the communications line 704 links together various circuits that include one or more processors 702 represented by the processor 702 and a memory represented by the memory 703. The communications line 704 may further link together various other circuits such as a peripheral device, a voltage stabilizer, and a power management circuit. These are well known in the art, and therefore are not further described in this application.

In a specific implementation, the baseband unit may include a memory, configured to store computer-readable instructions. The baseband unit may further include a communications interface coupled to the memory. The communications interface is configured to obtain a signal quality measurement report reported by a target terminal device. The baseband unit further includes a processor coupled to the communications interface. The processor is configured to execute the computer-readable instructions in the memory to perform the following operations: determining, based on the signal quality measurement report, a first carrier set and first spectral efficiency corresponding to all first carriers in the first carrier set; determining, based on first relationships and the first spectral efficiency corresponding to all the first carriers, first energy consumption growth coefficients corresponding to all the first carriers; and selecting a target carrier based on the first energy consumption growth coefficients corresponding to all the first carriers, and indicating the target terminal device to camp on a cell corresponding to the target carrier.

In a specific implementation, the processor is specifically configured to: perform derivation calculation on the first relationships to obtain energy consumption growth rates; and determine, based on the energy consumption growth rates and the first spectral efficiency corresponding to all the first carriers, the first energy consumption growth coefficients corresponding to all the first carriers.

In a specific implementation, the processor is specifically configured to: determine a smallest energy consumption growth coefficient from the first energy consumption growth coefficients corresponding to all the first carriers; and select, as the target carrier, a first carrier corresponding to the smallest energy consumption growth coefficient.

In a specific implementation, the processor is further specifically configured to: after determining the first carrier set based on the signal quality measurement report, determine second spectral efficiency of all second carriers in a second carrier set based on scheduling information, where each second carrier is a carrier that is in the first carrier set and that has established a connection to the target terminal device; determine second energy consumption growth coefficients of all the second carriers based on the first relationships and the second spectral efficiency of all the second carriers; and obtain, based on the second energy consumption growth coefficients of all the second carriers and a total amount of downlink scheduling data, amounts of downlink scheduling data scheduled by using the second carriers.

In a specific implementation, the processor is specifically configured to: determine allocation weights of the second carriers based on the second energy consumption growth coefficients of all the second carriers, where the allocation weights of the second carriers reflect offloading proportions of the total amount of downlink scheduling data on all the second carriers; and determine, based on the allocation weights of all the second carriers and the total amount of downlink scheduling data, the amounts of downlink scheduling data scheduled by using the second carriers.

In a specific implementation, the processor is further specifically configured to: before the signal quality measurement report reported by the target terminal device is obtained, select the target terminal device from at least one terminal device, where a running rate of the target terminal device is greater than or equal to a preset threshold.

The foregoing mainly describes the baseband unit provided in this embodiment of this application from a perspective of an entity function. From a perspective of a functional unit, in this application, the baseband unit may be divided into functional units based on the foregoing method embodiments. For example, each functional unit may be obtained through division based on a corresponding function, or two or more functions may be integrated into one functional unit. The integrated functional unit may be implemented in a form of hardware, or may be implemented in a form of a software functional unit.

Figure 8:
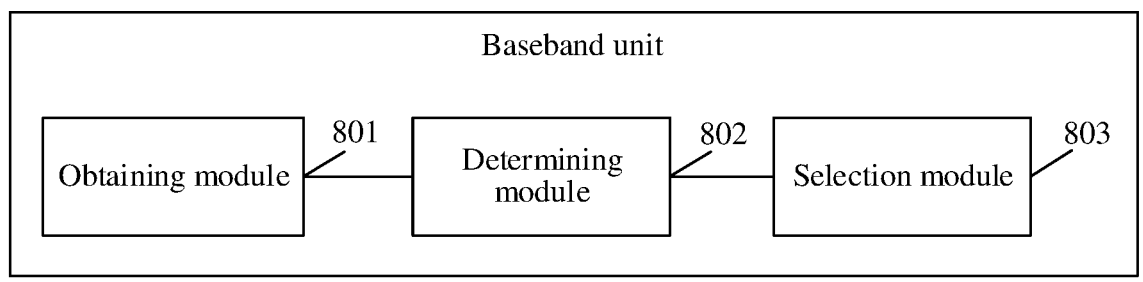
FIG. 8 is a schematic diagram of a structure of a baseband unit according to an embodiment of this application.

For example, functional units are obtained through division in an integrated manner. FIG. 8 is a schematic diagram of a structure of a baseband unit according to an embodiment of this application. As shown in FIG. 8, an embodiment of the baseband unit in this application may include:

an obtaining module 801, configured to obtain a signal quality measurement report reported by a target terminal device;

a determining module 802, configured to:

determine, based on the signal quality measurement report, a first carrier set and first spectral efficiency corresponding to all first carriers in the first carrier set, where the first carrier is a carrier that can be accessed by the target terminal device; and determine, based on first relationships and the first spectral efficiency corresponding to all the first carriers, first energy consumption growth coefficients corresponding to all the first carriers, where the first relationships indicate correspondences between energy consumption of a radio unit RU and loads of carriers, the carriers are carriers corresponding to the RU, and the first energy consumption growth coefficient reflects an energy consumption growth rate corresponding to a physical resource growth; and a selection module 803, configured to: select a target carrier based on the first energy consumption growth coefficients corresponding to all the first carriers, and indicate the target terminal device to camp on a cell corresponding to the target carrier.

In the foregoing manner, the determining module 802 determines, based on the first relationships and the first spectral efficiency corresponding to all the first carriers, the first energy consumption growth coefficients corresponding to all the first carriers, and then the selection module 803 selects a target carrier that causes relatively low energy consumption for the RU when a same service is provided. Therefore, an appropriate carrier is selected for the terminal device, and further energy consumption of the RU can be reduced when the carriers provide a same service.

In some embodiments, the determining module 802 is specifically configured to: perform derivation calculation on the first relationships to obtain energy consumption growth rates; and determine, based on the energy consumption growth rates and the first spectral efficiency corresponding to all the first carriers, the first energy consumption growth coefficients corresponding to all the first carriers.

In some other embodiments, the selection module 803 is specifically configured to: determine a smallest energy consumption growth coefficient from the first energy consumption growth coefficients corresponding to all the first carriers; and select, as the target carrier, a first carrier corresponding to the smallest energy consumption growth coefficient.

In some other embodiments, the determining module 802 is further specifically configured to: after determining the first carrier set based on the signal quality measurement report, determine second spectral efficiency of all second carriers in a second carrier set based on scheduling information, where each second carrier is a carrier that is in the first carrier set and that has established a connection to the target terminal device; determine second energy consumption growth coefficients of all the second carriers based on the first relationships and the second spectral efficiency of all the second carriers; and obtain, based on the second energy consumption growth coefficients of all the second carriers and a total amount of downlink scheduling data, amounts of downlink scheduling data scheduled by using the second carriers.

In some other embodiments, the determining module 802 is specifically configured to: determine allocation weights of the second carriers based on the second energy consumption growth coefficients of all the second carriers, where the allocation weights of the second carriers reflect offloading proportions of the total amount of downlink scheduling data on all the second carriers; and determine, based on the allocation weights of all the second carriers and the total amount of downlink scheduling data, the amounts of downlink scheduling data scheduled by using the second carriers.

In some other embodiments, the selection module 803 is further specifically configured to: before the obtaining module 801 obtains the signal quality measurement report reported by the target terminal device, select the target terminal device from at least one terminal device, where a running rate of the target terminal device is greater than or equal to a preset threshold.

In the foregoing, after determining the second energy consumption growth coefficients of all the second carriers, the determining module 802 may determine, from the total amount of downlink scheduling data by using the second energy consumption growth coefficients, the amounts of downlink scheduling data that needs to be scheduled by using all the second carriers. In this way, on a basis that the target terminal device has established connections to the plurality of second carriers, the total amount of downlink scheduling data can be properly allocated to all the second carriers by using the second energy consumption growth coefficients of the second carriers; and overall energy consumption is further reduced.

It may be clearly understood by persons skilled in the art that, for the purpose of convenient and brief description, for detailed working processes of the system, apparatus, and unit described above, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in the embodiments of this application. The foregoing storage medium includes any medium that can store program code, such as a USB flash drive, a removable hard disk, a read-only memory (ROM), a random access memory (random access memory, RAM), a magnetic disk, or an optical disc.

All or some of the foregoing embodiments may be implemented by using software, hardware, firmware, or any combination thereof. When the software is used for implementation, all or some of the embodiments may be implemented in a form of a computer program product.

The computer program product includes one or more computer instructions. When the computer-executable instructions are loaded and executed on a computer, all or some of the processes or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

The foregoing embodiments are merely intended to describe the technical solutions of this application, but not intended to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A carrier processing method, wherein the method is applied to a baseband unit and comprises:
   obtaining a signal quality measurement report reported by a target terminal device;
   determining, based on the signal quality measurement report, a first carrier set comprising a plurality of first carriers and a first spectral efficiency corresponding to each first carrier in the first carrier set, wherein each first carrier is a carrier that can be accessed by the target terminal device;
   determining, based on first relationships and the first spectral efficiency corresponding to each first carrier, first energy consumption growth coefficients corresponding to each first carrier, wherein the first relationships indicate correspondences between energy consumption of a radio unit (RU) and loads of carriers, the carriers are carriers corresponding to the RU, and the first energy consumption growth coefficient reflects a relation between downlink load and energy consumption of a carrier; and
   selecting a target carrier based on the first energy consumption growth coefficients corresponding to each first carrier, and indicating the target terminal device to camp on a cell corresponding to the target carrier.

2. The processing method according to claim 1, wherein the determining, based on first relationships and the first spectral efficiency corresponding to each first carrier, first energy consumption growth coefficients corresponding to each first carrier comprises:
   performing derivation calculation on the first relationships to obtain energy consumption growth rates; and
   determining, based on the energy consumption growth rates and the first spectral efficiency corresponding to each first carrier, the first energy consumption growth coefficients corresponding to each first carrier.

3. The processing method according to claim 1, wherein the selecting a target carrier based on the first energy consumption growth coefficients corresponding to each first carrier comprises:
   determining a smallest energy consumption growth coefficient from the first energy consumption growth coefficients corresponding to each first carrier; and
   selecting, as the target carrier, a first carrier corresponding to the smallest energy consumption growth coefficient.

4. The processing method according to claim 1, wherein after the determining, based on the signal quality measurement report, the first carrier set, the processing method further comprises:
   determining a second spectral efficiency of each second carrier in a second carrier set based on scheduling information, wherein each second carrier is a carrier that is in the first carrier set and that has established a connection to the target terminal device;
   determining a second energy consumption growth coefficient of each second carrier based on the first relationships and the second spectral efficiency of each second carrier; and
   obtaining, based on the second energy consumption growth coefficient of each second carrier and a total amount of downlink scheduling data, amounts of downlink scheduling data scheduled by using each second carrier.

5. The processing method according to claim 4, wherein the obtaining, based on the second energy consumption growth coefficient of each second carrier and the total amount of downlink scheduling data, amounts of downlink scheduling data scheduled by using each second carrier comprises:
   determining allocation weights of each second carrier based on the second energy consumption growth coefficient of each second carrier, wherein the allocation weights of each second carrier reflects offloading proportions of the total amount of downlink scheduling data on each second carrier; and
   determining, based on the allocation weight of each second carrier and the total amount of downlink scheduling data, the amounts of downlink scheduling data scheduled by using each second carrier.

6. The processing method according to claim 1, wherein the first relationships are obtained based on a trained load energy consumption model, the trained load energy consumption model is a model obtained after a load energy consumption model is iteratively trained by using historical energy consumption information of the RU and historical load information of the first carriers as training data, and output of the load energy consumption model indicates the relationships between the energy consumption of the RU and the loads of the first carriers.

7. The processing method according to claim 1, wherein before the obtaining the signal quality measurement report reported by the target terminal device, the processing method further comprises:
   selecting the target terminal device from at least one terminal device, wherein a running rate of the target terminal device is greater than or equal to a preset threshold.

8. A baseband unit comprising:
   at least one processor; and
   one or more memories including computer instructions that, when executed by the at least one processor, cause the baseband unit to perform operations comprising:
   obtaining a signal quality measurement report reported by a target terminal device;
   determining, based on the signal quality measurement report, a first carrier set comprising a plurality of first carriers and a first spectral efficiency corresponding to each first carrier in the first carrier set, wherein each first carrier is a carrier that can be accessed by the target terminal device;

determining, based on first relationships and the first spectral efficiency corresponding to each first carrier, first energy consumption growth coefficients corresponding to each first carrier, wherein the first relationships indicate correspondences between energy consumption of a radio unit (RU) and loads of carriers, the carriers are carriers corresponding to the RU, and the first energy consumption growth coefficient reflects a relation between downlink load and energy consumption of a carrier; and selecting a target carrier based on the first energy consumption growth coefficients corresponding to each first carrier, and indicating the target terminal device to camp on a cell corresponding to the target carrier.

9. The baseband unit according to claim 8, wherein the determining, based on first relationships and the first spectral efficiency corresponding to each first carrier, first energy consumption growth coefficients corresponding to each first carrier comprises:

performing derivation calculation on the first relationships to obtain energy consumption growth rates; and determining, based on the energy consumption growth rates and the first spectral efficiency corresponding to each first carrier, the first energy consumption growth coefficients corresponding to each first carrier.

10. The baseband unit according to claim 8, wherein the selecting a target carrier based on the first energy consumption growth coefficients corresponding to each first carrier comprises:

determining a smallest energy consumption growth coefficient from the first energy consumption growth coefficients corresponding to each first carrier; and selecting, as the target carrier, a first carrier corresponding to the smallest energy consumption growth coefficient.

11. The baseband unit according to claim 8, wherein the operations further comprise:

after the determining the first carrier set, determining a second spectral efficiency of each second carrier in a second carrier set based on scheduling information, wherein each second carrier is a carrier that is in the first carrier set and that has established a connection to the target terminal device;

determining a second energy consumption growth coefficient of each second carrier based on the first relationships and the second spectral efficiency of each second carrier; and obtaining, based on the second energy consumption growth coefficient of each second carrier and a total amount of downlink scheduling data, amounts of downlink scheduling data scheduled by using each second carrier.

12. The baseband unit according to claim 11, wherein the obtaining, based on the second energy consumption growth coefficient of each second carrier and the total amount of downlink scheduling data, amounts of downlink scheduling data scheduled by using each second carrier comprises:

determining allocation weights of each second carrier based on the second energy consumption growth coefficient of each second carrier, wherein the allocation weights of each second carrier reflects offloading proportions of the total amount of downlink scheduling data on each second carrier; and determining, based on the allocation weight of each second carrier and the total amount of downlink scheduling data, the amounts of downlink scheduling data scheduled by using each second carrier.

13. The baseband unit according to claim 8, wherein the first relationships are obtained based on a trained load energy consumption model, the trained load energy consumption model is a model obtained after a load energy consumption model is iteratively trained by using historical energy consumption information of the RU and historical load information of the first carriers as training data, and output of the load energy consumption model indicates the relationships between the energy consumption of the RU and the loads of the first carriers.

14. The baseband unit according to claim 8, wherein the operations further comprise:

before the obtaining the signal quality measurement report, selecting the target terminal device from at least one terminal device, wherein a running rate of the target terminal device is greater than or equal to a preset threshold.

15. A non-transitory computer-readable storage medium including instructions, wherein when the instructions are run on a computer apparatus, the computer apparatus is enabled to perform a method comprising:

obtaining a signal quality measurement report reported by a target terminal device;

determining, based on the signal quality measurement report, a first carrier set comprising a plurality of first carriers and a first spectral efficiency corresponding to each first carrier in the first carrier set, wherein each first carrier is a carrier that can be accessed by the target terminal device;

determining, based on first relationships and the first spectral efficiency corresponding to each first carrier, first energy consumption growth coefficients corresponding to each first carrier, wherein the first relationships indicate correspondences between energy consumption of a radio unit (RU) and loads of carriers, the carriers are carriers corresponding to the RU, and the first energy consumption growth coefficient reflects a relation between downlink load and energy consumption of a carrier; and selecting a target carrier based on the first energy consumption growth coefficients corresponding to each first carrier, and indicating the target terminal device to camp on a cell corresponding to the target carrier.

16. The non-transitory computer-readable storage medium according to claim 15, wherein the determining, based on first relationships and the first spectral efficiency corresponding to each first carrier, first energy consumption growth coefficients corresponding to each first carrier comprises:

performing derivation calculation on the first relationships to obtain energy consumption growth rates; and determining, based on the energy consumption growth rates and the first spectral efficiency corresponding to each first carrier, the first energy consumption growth coefficients corresponding to each first carrier.

17. The non-transitory computer-readable storage medium according to claim 15, wherein the selecting a target carrier based on the first energy consumption growth coefficients corresponding to each first carrier comprises:

determining a smallest energy consumption growth coefficient from the first energy consumption growth coefficients corresponding to each first carrier; and selecting, as the target carrier, a first carrier corresponding to the smallest energy consumption growth coefficient.

18. The non-transitory computer-readable storage medium according to claim 15, wherein the method further comprises:
- after the determining the first carrier set, determining a second spectral efficiency of each second carrier in a second carrier set based on scheduling information, wherein each second carrier is a carrier that is in the first carrier set and that has established a connection to the target terminal device;
- determining a second energy consumption growth coefficient of each second carrier based on the first relationships and the second spectral efficiency of each second carrier; and
- obtaining, based on the second energy consumption growth coefficient of each second carrier and a total amount of downlink scheduling data, amounts of downlink scheduling data scheduled by using each second carrier.

19. The non-transitory computer-readable storage medium according to claim 18, wherein the obtaining, based on the second energy consumption growth coefficient of each second carrier and the total amount of downlink scheduling data, amounts of downlink scheduling data scheduled by using each second carrier comprises:
- determining allocation weights of each second carrier based on the second energy consumption growth coefficient of each second carrier, wherein the allocation weights of each second carrier reflects offloading proportions of the total amount of downlink scheduling data on each second carrier; and
- determining, based on the allocation weight of each second carrier and the total amount of downlink scheduling data, the amounts of downlink scheduling data scheduled by using each second carrier.

20. The non-transitory computer-readable storage medium according to claim 15, wherein the first relationships are obtained based on a trained load energy consumption model, the trained load energy consumption model is a model obtained after a load energy consumption model is iteratively trained by using historical energy consumption information of the RU and historical load information of the first carriers as training data, and output of the load energy consumption model indicates the relationships between the energy consumption of the RU and the loads of the first carriers.

* * * * *